Nov. 2, 1965   W. E. FOX   3,214,840
DUAL LIQUID COMPARATOR GAGE AND INDICATOR
Filed June 22, 1964

INVENTOR.
William E. Fox
BY
ATTORNEY.

United States Patent Office 3,214,840
Patented Nov. 2, 1965

3,214,840
DUAL LIQUID COMPARATOR GAGE
AND INDICATOR
William E. Fox, 708 W. High, Dowagiac, Mich.
Filed June 22, 1964, Ser. No. 376,685
11 Claims. (Cl. 33—172)

The invention relates to improvements in comparator gages.

The principal objects of this invention are:

First, to provide a comparator gage for measuring extremely small difference in eccentricity or heights of different work pieces by comparing the distance or dimension of the work piece with other work pieces or other positions of the work.

Second, to provide an improved form of comparator gage similar to that shown in Patent 3,059,340 for Eccentricity and Alignment Gage which will operate more rapidly than the gage in the identified patent.

Third, to provide a comparator gage which may be utilized as an automatic control through electrical connections in response to variation in the size or position of the work being compared or tested.

Other objects and advantages of the invention will be apparent from a consideration of the following description and claims. The drawings of which there is one sheet illustrate two highly practical forms of the comparator gage of the invention.

Figures 1, 2, 3, 4:
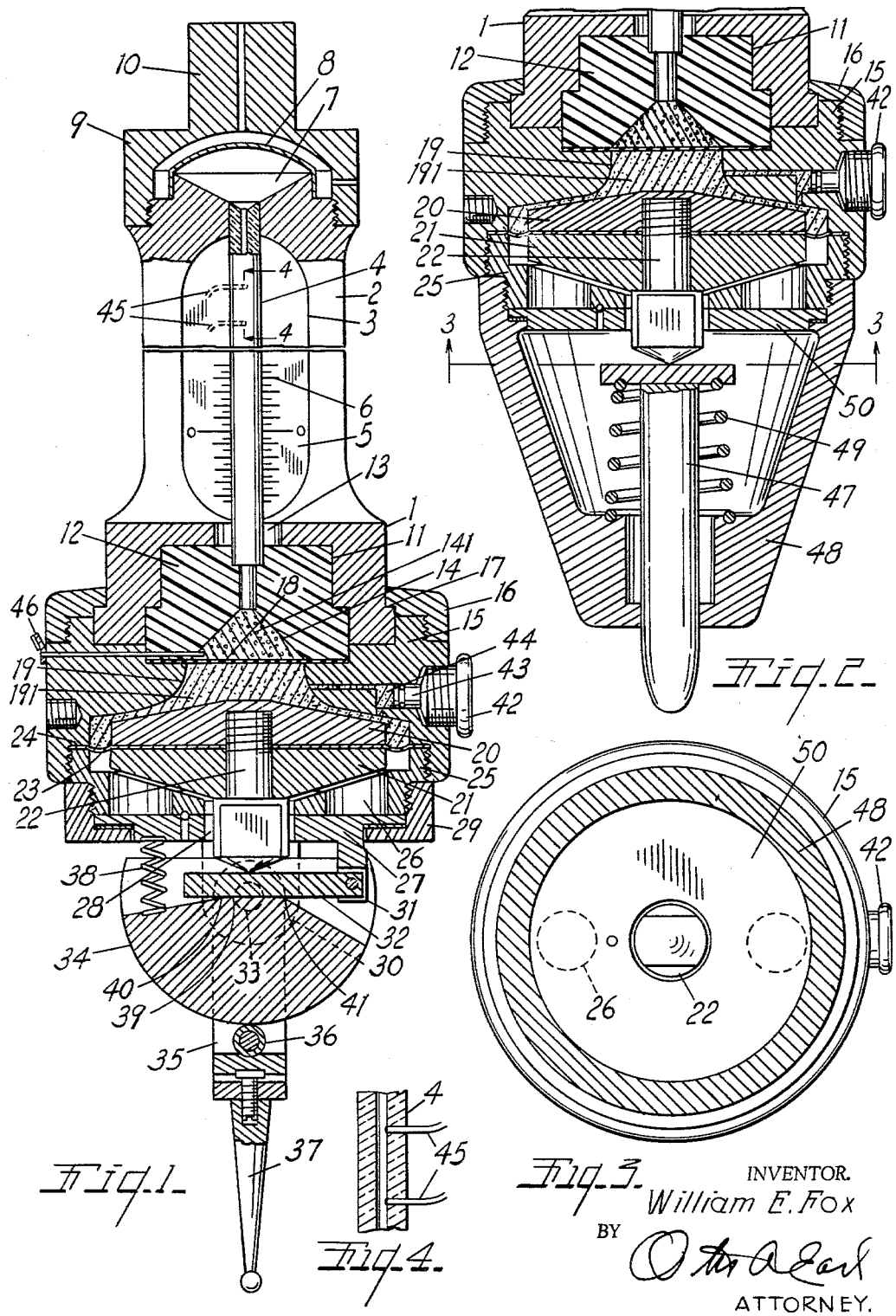
FIG. 1 is a vertical longitudinal cross sectional view through the gage and its work engaging portions.
FIG. 2 is a fragmentary enlarged vertical cross sectional view through the lower end of a modified form of the gage structure shown in FIG. 1.
FIG. 3 is a transverse cross sectional view taken along the plane of the line 3—3 in FIG. 2 looking in the direction of the arrows.
FIG. 4 is an enlarged fragmentary cross sectional view taken along the plane of the line 4—4 in FIG. 1 and looking in the direction of the arrows.

The comparator gage of both forms of the invention illustrated includes an elongated body 1 that is transversely slotted from two directions as at 2 to provide a central opening or recess 3 within which a transparent sight tube 4 is positioned. Indicia plates or cards 5 having scale graduations 6 are positioned diagonally between the remaining corner posts of the body and the sides of the tube so that the gage may be read from either of the four sides of the body. The upper end of the body has a conical recess 7 formed thereinto which the upper end of the sight tube 4 opens. A cap or shield 8 which may be of semiflexible material closes the upper end of the body to seal the end of the tube and is desirably filled with an inert gas. A cover or mounting cap 9 is secured over the seal 8 by threading onto the body and is provided with a cylindrical neck and by means of which the gage may be supported or connected to a suitable chuck or mounting support.

The lower end of the body 1 defines a downwardly opening generally cylindrical recess 11 within which is mounted a block 12 desirably of plastic or glass which receives the lower end of the sight tube through the opening 13 and which defines a further downwardly opening recess or first liquid chamber 14. The block 12 is secured in place by bearing against the top of an annular member 15 which is clamped against the bottom of the elongated body and the block 12 by a ring 16 threaded on the annular member and overlapping a shoulder 17 on the exterior of the elongated body. The annular member 15 clamps a first diaphragm 18 of flexible material such as rubber between the block 12 and the annular member. The glass, plastic and rubber surface of chamber 14 and tube 4 prevents contamination of the charge of mercury in the chamber.

The annular member 15 defines a downwardly opening recess 19 which is flared outwardly to be larger in diameter than the recess 14. The recess or chamber 19 receives a two part piston having an upper block or part 20 and a lower block or part 21 secured together by the screw 22 and clamping a second diaphragm 23 of thin semiflexible brass between the two parts of the piston. The periphery of the diaphragm 23 is clamped against a shoulder 24 in the annular member by a clamp ring 25 threaded into the lower end of the annular member. Holes 26 formed in the clamp ring are adapted to receive a spanner wrench for tightening the clamp ring in place. Secured to the lower end of the clamp ring 25 is a circular abutment member 27 defining a central hole 28 through which the lower actuating end of the screw 22 projects. The abutment member 27 is clamped in place by a ring 29 threaded on the lower end of the clamp ring 25.

As in the patent identified earlier, the abutment member 27 carries a pair of laterally spaced pivot ears 30 and a depending pivot bearing member 31 spaced from the ears with an actuating bar 32 supported on the pivot bearing member and projecting between the ears. Pivots 33 supported on the pivot ears support a sector shaped actuating member 34 and a work engaging yoke 35 is pivotly supported on the sides of the actuating sector for adjustment to different angularly disposed positions. A friction bearing member 36 adjustably connects the yoke 35 to the actuating sector and a work engaging pin or bar 37 projects from the yoke 35.

With the body 1 supported in a given fixed position relative to work to be engaged or compared a spring 38 biases actuator bar 32 downwardly until it rests upon a central flat surface 39 on the top of the actuating sector. The sector is cut away at the top from a first lifting edge 40 closely adjacent the pivot 30 and a second lifting edge 41 positioned closer to the pivot support 31. As the work engaging pin or bar 37 is engaged by the work to be moved in a clockwise direction as viewed in FIG. 1 the edge 40 lifts the actuator bar 32 and the screw 22 from the piston at a first and relatively low ratio to the unit movement of the pin 37. If the pin 37 is moved counterclockwise the edge 41 lifts the actuator bar at a second and substantially greater ratio relative to the unit movement of the work engaging pin. The sensivity of the gage may thus be predetermined by fixing the distances of the edges 40 and 41 from the pivot support 31.

In either movement of the actuator bar 32 the piston 20–21 is moved upwardly displacing a surface wetting liquid 191 in the chamber 19 and in turn displacing the flexible diaphragm 18 to force a mass of mercury 141 from the chamber 14 up into the sight tube 4. The initial level of the mercury in the sight tube may be adjusted by turning a screw 42 to move the adjusting piston 43 inwardly or outwardly of the small adjustment cavity 44 which communicates with the chamber 19. By this means the comparator gage may be adjusted with the work engaging pin 37 in a predetermined position relative to a master work piece and the gage set to zero. Thereafter movement of the work pin by another work piece will give a direct reading of the relative sizes or positions of the second work piece to the first or master setting. Measurements or comparisons of the order of .000010 may be read on the scale 6 and will repeat the comparison within .000005.

The mercury in the sight tube 4 and first chamber 14 returns rapidly to lower position when pressure on the diaphragm 18 is relieved so that work may be rapidly applied and engaged by the gage. At the same time the surface wetting liquid in the lower chamber 19 responds accurately to small deflections of the piston 20, 21.

FIG. 4 indicates a further method of using the gage. One or more metallic electrodes or terminals 45 are passed through the walls of sight tube 4 at predetermined points and an electrical contact or terminal 46 extending through body 15 and between block 12 and diaphragm 18 makes electrical contact with the body of mercury in the chamber 14. It is evident that raising of the column of mercury in the sight tube until it reaches one or the other of the terminals 45 may be made to complete a contact for controlling various machines or operations in response to minute movements of the work engaging pin 37. The simultaneous contacting of the two space terminals 45 may be used to complete a control circuit resulting from a movement corresponding to the indicated distance between the two terminals.

The modified form of comparator shown in FIGURES 2 and 3 is the same as that in FIG. 1 except that the actuating head of the screw 22 engages a work engaging pin 47 extending directly through a retaining housing 48 to the work. A spring 49 biases the pin and the screw to a neutral position and the actuating sector 34 and the actuator bar 32 are eliminated. The housing 48 is secured to the lower end of the clamp ring 25 in place of the clamp ring 29 and assumes the function of the ring 29 in securing the bottom plate 50 to the bottom of the gage in place of the abutment plate 27. The gage in FIGURES 2 and 3 performs the same function as the gage in FIG. 1 without the variable multiplication of the readings provided by the actuating sector 34.

Mercury is selected as a preferred form of liquid in the upper chamber 14 because it has non-wetting properties and it is electrically conductive and heavy to rise and fall quickly in the tube 4 and make contact with the terminals 45. The tube is desirably a capillary tube. The liquid in the lower liquid chamber must have a wetting action or contact with the walls to flow freely in the chamber and also to permit exclusion of all air from chamber 19. Any liquid with suitable wetting additive that will not attack or react with the metal of the diaphragm 23 or the walls of chamber or cavity 19 including the flexible diaphragm 18 is satisfactory. The spring of the metallic second diaphragm 23 returns the piston to a neutral position when pressure is released. The lower diaphragm is much larger than the area of the passage in the sight tube giving a calculated multiplication of displacement of liquid by the first diaphragm into displacement of liquid in the sight tube so that very small deflections of the work engaging member are readily readable on the sight tube.

What is claimed as new is:

1. In a comparator gage having an elongated transversely slotted body defining a sight opening with a transparent graduated sight tube having its ends mounted in the ends of the body and extending through said slot,
   a seal on the top of said body defining a space communicating with the upper end of said tube,
   a cap secured over said seal and forming a mounting means for said body,
   a block received in a recess formed in the bottom of said body receiving the lower end of said tube and defining a first chamber communicating with the lower end of the tube,
   an annular member secured to the lower end of said body by a clamp ring threaded on the member and engaging a shoulder on said body,
   said annular member clamping a first flexible diaphragm over the lower end of said first chamber,
   said annular member defining a second central chamber below said diaphragm,
   a two piece piston positioned in said second chamber and having a second flexible diaphragm clamped between the parts of the piston,
   a screw disposed centrally of said piston holding the parts thereof together and having a pointed piston actuating lower end,
   a clamp ring threaded on said annular member clamping the periphery of said second diaphragm to a shoulder on said annular member,
   said annular member defining a passage opening to said second chamber with a displacement pin threaded into the passage to adjust the volume of said second chamber,
   an abutment plate secured to the bottom of said annular member in the path of said piston by a second ring threaded on said clamp ring with said piston actuating end passed therethrough,
   pivot support ears depending from said abutment plate on opposite sides of said piston actuating end,
   a pivot bearing depending from said abutment plate and having an actuator bar pivoted thereon and extending between said ears and under said actuating end,
   means including a work engaging bar and an actuator segment pivoted on said ears to move said actuator bar and said piston different distances by unit movement of the work engaging bar in opposite directions,
   a plurality of electrical terminals extending in sealing relation through said sight tube at different levels to be contacted by the metallic liquid rising in said tube,
   another terminal electrically connected to the mass of metal in said first chamber through said body,
   and a mass of liquid metallic mercury partially filling said first chamber and displaceable into said tube,
   a mass wall wettable liquid filling said second chamber above said second diaphragm and displaceable by said piston and second diaphragm to displace said first diaphragm.

2. In a comparator gage having an elongated transversely slotted body defining a sight opening with a transparent graduated sight tube having its ends mounted in the ends of the body and extending through said slot,
   a seal on the top of said body defining a space communicating with the upper end of said tube,
   a block received in a recess formed in the bottom of said body receiving the lower end of said tube and defining a first chamber communicating with the lower end of the tube,
   an annular member secured to the lower end of said body by a clamp ring threaded on the member and engaging a shoulder on said body,
   said annular member clamping a first flexible diaphragm over the lower end of said first chamber,
   said annular member defining a second central chamber below said diaphragm,
   a two piece piston positioned in said second chamber and having a second flexible diaphragm clamped between the parts of the piston,
   a screw disposed centrally of said piston holding the parts thereof together and having a piston actuating lower end,
   a clamp ring threaded on said annular member clamping the periphery of said second diaphragm to a shoulder on said annular member,
   an abutment plate secured to the bottom of said annular member in the path of said piston by a second ring threaded on said clamp ring with said piston actuating end passed therethrough,
   means carried by said clamp ring to move said end of said pin and said piston by engagement with work to be compared,
   an electrical terminal extending in sealing relation through said sight tube to be contacted by the metallic liquid rising in said tube,
   another terminal electrically connected to the mass of metal in said first chamber,
   and a mass of liquid metallic mercury partially filling said first chamber and displaceable into said tube, a mass wall wettable liquid filling said second chamber above said second diaphragm and displaceable by said piston and second diaphragm to displace said first diaphragm.

3. In a comparator gage having an elongated body with a transparent graduated sight tube having its ends mounted in the ends of the body,
- a seal on the top of said body defining a space communicating with the upper end of said tube,
- a block received in a recess formed in the bottom of said body receiving the lower end of said tube and defining a first chamber communicating with the lower end of the tube,
- an annular member secured to the lower end of said body,
- said annular member clamping a first flexible diaphragm over the lower end of said first chamber,
- said annular member defining a second central chamber below said diaphragm,
- a piston positioned in said second chamber and having a second flexible diaphragm engaged with the piston,
- a screw disposed centrally of said piston and having a piston actuating lower end,
- a clamp ring secured to said annular member and clamping the periphery of said second diaphragm to a shoulder on said annular member,
- an abutment plate secured to the bottom of said clamp ring with said piston actuating end passed therethrough,
- means carried by said clamp ring and positioned to move said end of said pin and said piston by engagement with work to be compared,
- an electrical terminal extending in sealing relation through said sight tube to be contacted by liquid rising in said tube,
- another terminal electrically connected to the mass of metal in said first chamber,
- a mass of mercury partially filling said first chamber and displaceable into said tube,
- and a mass of wall wettable liquid filling said second chamber above said second diaphragm and displaceable by said piston and second diaphragm to displace said first diaphragm.

4. In a comparator gage having an elongated body with a transparent graduated sight tube having its ends mounted in the ends of the body,
- a seal on the top of said body defining a space communicating with the upper end of said tube,
- a block received in a recess formed in the bottom of said body receiving the lower end of said tube and defining a first chamber communicating with the lower end of the tube,
- an annular member secured to the lower end of said body,
- said annular member clamping a first flexible diaphragm over the lower end of said first chamber,
- said annular member defining a second central chamber below said diaphragm,
- a piston positioned in said second chamber and having a second flexible diaphragm engaged with the piston,
- a screw disposed centrally of said piston and having a piston actuating lower end,
- a clamp ring secured to said annular member and clamping the periphery of said second diaphragm to a shoulder on said annular member,
- an abutment plate secured to the bottom of said clamp ring with said piston actuating end passed therethrough,
- means carried by said clamp ring and positioned to move said end of said pin and said piston by engagement with work to be compared,
- a mass of mercury partially filling said first chamber and displaceable into said tube,
- and a mass of wall wettable liquid filling said second chamber above said second diaphragm and displaceable by said piston and second diaphragm to displace said first diaphragm.

5. In a comparator gage having an elongated body with a transparent sight tube having its ends mounted in the ends of the body,
- a seal on the top of said body defining a space communicating with the upper end of said tube,
- a cap secured over said seal and forming a mounting means for said body,
- means at the bottom of said body receiving the lower end of said tube and defining a first chamber communicating with the lower end of the tube,
- an annular member secured to the lower end of said body,
- said annular member clamping a first flexible diaphragm over the lower end of said first chamber,
- said annular member defining a second central chamber below said diaphragm,
- a piston positioned in said second chamber and having a second flexible diaphragm engaged with the piston,
- means disposed centrally of said piston and having piston actuating lower end,
- means secured to said annular member clamping the periphery of said second diaphragm to a shoulder on said annular member,
- an abutment plate secured to the bottom of said annular member with said piston actuating end passed therethrough,
- pivot support ears depending from said abutment plate on opposite sides of said piston actuating end,
- a pivot bearing depending from said abutment plate and having an actuator bar pivoted thereon and extending between said ears and under said actuating end,
- means including a work engaging bar and an actuator segment pivoted on said ears to move said actuator bar and said piston different distances by unit movement of the work engaging bar in opposite directions,
- a mass of a relatively heavy liquid partially filling said first chamber and displaceable into said tube,
- and a mass of a relatively light liquid filling said second chamber above said second diaphragm and displaceable by said piston and second diaphragm to displace said first diaphragm.

6. A hydraulic comparator gage comprising,
- a sight tube having gage indicia marks disposed therealong,
- means forming a gaseous chamber at the top of said tube and means forming a first liquid chamber at the bottom of said tube with both chambers communicating with the tube,
- means forming a second liquid chamber adjacent and below said first liquid chamber,
- a flexible diaphragm separating said liquid chambers,
- a second diaphragm forming part of said second liquid chamber at the bottom thereof,
- adjustable means for varying the volume of said second liquid chamber,
- an actuating member connected to deflect said second diaphragm into said second chamber,
- work engaging means connected to move said actuating member at selectively different predetermined ratios to the movement of the work engaging means,
- a metallic electrically conductive liquid having non-wetting properties in said first liquid chamber and projectable therefrom into said tube,
- and a different liquid having wall wetting properties filling said second liquid chamber,
- said second diaphragm having a larger diameter than said first diaphragm,
- said tube having plural electrical terminals projecting therethrough at different levels to be contacted by said conductive liquid, said means forming said second liquid chamber having a terminal thereon electrically connected to said conducting liquid through the chamber forming means.

7. A hydraulic comparator gage comprising,
a sight tube having gage indicia marks disposed therealong,
means forming a gaseous chamber at the top of said tube and means forming a first liquid chamber at the bottom of said tube with both chambers communicating with the tube,
means forming a second liquid chamber adjacent and below said first liquid chamber,
a flexible diaphragm separating said liquid chambers,
a second diaphragm forming part of said second liquid chamber at the bottom thereof,
an actuating member connected to deflect said second diaphragm into said second chamber,
work engaging means connected to move said actuating member at selectively different predetermined ratios to the movement of the work engaging means,
a relatively heavy electrically conductive liquid having non-wetting properties in said first liquid chamber and projectable therefrom into said tube,
and a relatively light liquid having wall wetting properties filling said second liquid chamber,
said second diaphragm having a larger diameter than said first diaphragm,
said tube having plural electrical terminals projecting therethrough at different levels to be contacted by said conductive liquid,
said means forming said second liquid chamber having a terminal thereon electrically connected to said conducting liquid through the chamber forming means.

8. A hydraulic comparator gage comprising,
a sight tube having gage indicia marks disposed therealong,
means forming a gaseous chamber at the top of said tube and means forming a first liquid chamber at the bottom of said tube with both chambers communicating with the tube,
means forming a second liquid chamber adajacent and below said first liquid chamber,
a flexible diaphragm separating said liquid chambers,
a second diaphragm forming part of said second liquid chamber at the bottom thereof,
an actuating member connected to deflect said second diaphragm into said second chamber,
work engaging means connected to move said actuating member at selectively different predetermined ratios to the movement of the work engaging means,
a relatively heavy liquid having non-wetting properties in said first liquid chamber and projectionable therefrom into said tube,
and a relatively light liquid having wall wetting properties filling said second liquid chamber,
said second diaphragm having a larger diameter than said first diaphragm.

9. A hydraulic comparator gage comprising,
a sight tube having gage indicia marks disposed therealong,
means forming a gaseous chamber at the top of said tube and means forming a first liquid chamber at the bottom of said tube with both chambers communicating with the tube,
means forming a second liquid chamber adjacent and below said first liquid chamber,
a flexible diaphragm separating said liquid chambers,
a second diaphragm forming part of said second liquid chamber at the bottom thereof,
an actuating member connected to deflect said second diaphragm into said second chamber,
work engaging means connected to move said actuating member,
a metallic electrically conductive liquid having non-wetting properties in said first liquid chamber and projectable therefrom into said tube,
and a different liquid having wall wetting properties filling said second liquid chamber,
said tube having plural electrical terminals projecting therethrough at different levels to be contacted by said conductive liquid,
said means forming said second liquid chamber having a terminal thereon electrically connected to said conducting liquid.

10. A hydraulic comparator gage comprising,
a sight tube having gage indicia marks disposed therealong,
means exposing the top of said tube to surrounding pressure and means forming a first liquid chamber at the bottom of said tube with said chamber communicating with the tube,
means forming a second liquid chamber adjacent and below said first liquid chamber,
a flexible diaphragm separating said liquid chambers,
a second diaphragm forming part of said second liquid chamber at the bottom thereof,
an actuating member connected to move said actuating member diaphragm into said second chamber,
work engaging means connected to move said actuating member,
a metallic electrically conductive liquid having non-wetting properties in said first liquid chamber and projectable therefrom into said tube,
and a relatively light liquid having wall wetting properties filling said second liquid chamber,
said tube having plural electrical terminals projecting therethrough at different levels to be contacted by said conductive liquid,
said means forming said second liquid chamber having a terminal thereon electrically connected to said conducting liquid.

11. A hydraulic comparator gage comprising,
a sight tube having gage indicia marks disposed therealong,
means exposing the top of said tube to surrounding pressure and means forming a first liquid chamber at the bottom of said tube with said chamber communicating with the tube,
means forming a second liquid chamber adjacent and below said first liquid chamber,
a flexible diaphragm separating said liquid chambers,
a second diaphragm forming part of said second liquid chamber at the bottom thereof,
an actuating member connected to move said actuating member diaphragm into said second chamber,
work engaging means connected to move said actuating member,
a relatively heavy liquid in said first liquid chamber and projectable therefrom into said tube,
and a relatively light liquid filling said second liquid chamber.

References Cited by the Examiner

UNITED STATES PATENTS

| 904,277 | 11/08 | Purington | 33—172 |
|---|---|---|---|
| 1,524,047 | 1/25 | Lutz | 33—147 |
| 2,398,375 | 4/46 | Heenan | 200—81.6 |
| 2,566,369 | 9/51 | Putman | 200—81.6 |
| 2,639,613 | 5/53 | Richmond | 73—161 |
| 2,721,317 | 10/55 | O'Neill | 33—172 X |
| 2,889,704 | 6/59 | Baker | 73—37.9 |
| 3,059,340 | 10/62 | Fox | 33—172 X |

FOREIGN PATENTS

| 4820/31 | 12/31 | Australia. |
|---|---|---|
| 1,147,752 | 11/57 | France. |

ISAAC LISANN, *Primary Examiner.*

ROBERT B. HULL, *Examiner.*